United States Patent

Mullerheim et al.

[11] Patent Number: 5,837,142
[45] Date of Patent: Nov. 17, 1998

[54] MEMBRANE PROCESS FOR TREATING SANITARY WASTEWATER

[75] Inventors: Steven B. Mullerheim, Berkeley; Guy W. Roy, Danville, both of Calif.

[73] Assignee: Great Circle Associates, Berkeley, Calif.

[21] Appl. No.: 823,254

[22] Filed: Mar. 24, 1997

Related U.S. Application Data

[63] Continuation-in-part of Ser. No. 718,762, Sep. 23, 1996, abandoned.

[51] Int. Cl.⁶ .................................................. B01D 61/58
[52] U.S. Cl. ...................... 210/650; 210/173; 210/748; 210/758; 210/764; 210/768; 210/770; 210/805; 210/806
[58] Field of Search .................. 210/173, 259, 210/387, 400, 631, 650, 748, 757, 758, 760, 764, 768–770, 772, 773, 780, 783, 805, 806, 401, 609, 651

[56] References Cited

U.S. PATENT DOCUMENTS

| | | | |
|---|---|---|---|
| 4,096,060 | 6/1978 | Lee et al. | 210/650 |
| 4,137,062 | 1/1979 | Mullerheim et al. | 71/9 |
| 4,217,219 | 8/1980 | Mullerheim et al. | 210/97 |
| 4,229,202 | 10/1980 | Mullerheim et al. | 71/8 |
| 4,554,002 | 11/1985 | Nicholson | 71/12 |
| 4,781,842 | 11/1988 | Nicholson | 210/751 |
| 4,902,431 | 2/1990 | Nicholson et al. | 210/751 |
| 4,952,317 | 8/1990 | Culkin | 210/636 |
| 5,014,564 | 5/1991 | Culkin | 74/61 |
| 5,256,288 | 10/1993 | Lee | 210/321.61 |
| 5,259,952 | 11/1993 | Lee | 210/137 |
| 5,292,438 | 3/1994 | Lee | 210/504 |
| 5,445,746 | 8/1995 | Lee | 210/783 |
| 5,492,632 | 2/1996 | Reber | 210/400 |
| 5,635,074 | 6/1997 | Stenstrom et al. | 210/783 |

*Primary Examiner*—Joseph W. Drodge
*Attorney, Agent, or Firm*—Thomas M. Freiburger

[57] ABSTRACT

A method and apparatus for treating sanitary wastewater using membrane filtration are disclosed. Designed principally for complete on-site sewage treatment and disposal, the system separates wastewater into liquid and concentrated solid components by membrane separation; then dries, disinfects, and deodorizes the solid component by a variety of methods to render it reusable or more easily stored and disposed. The liquid component is discharged or reused as is, or is further treated to render it disposable or reusable for particular applications. Alternatives for treating the solids component include mixing with alkaline admixtures and composting with other cellulose-based wastes. Alternatives for treating the liquid component include deodorization and biological stabilization by ultraviolet radiation and ozonation. Preferred and particularly advantageous embodiments of a membrane filtration system, a liquid treatment subsystem, a solids treatment subsystem, and a flushing subsystem are described.

16 Claims, 7 Drawing Sheets

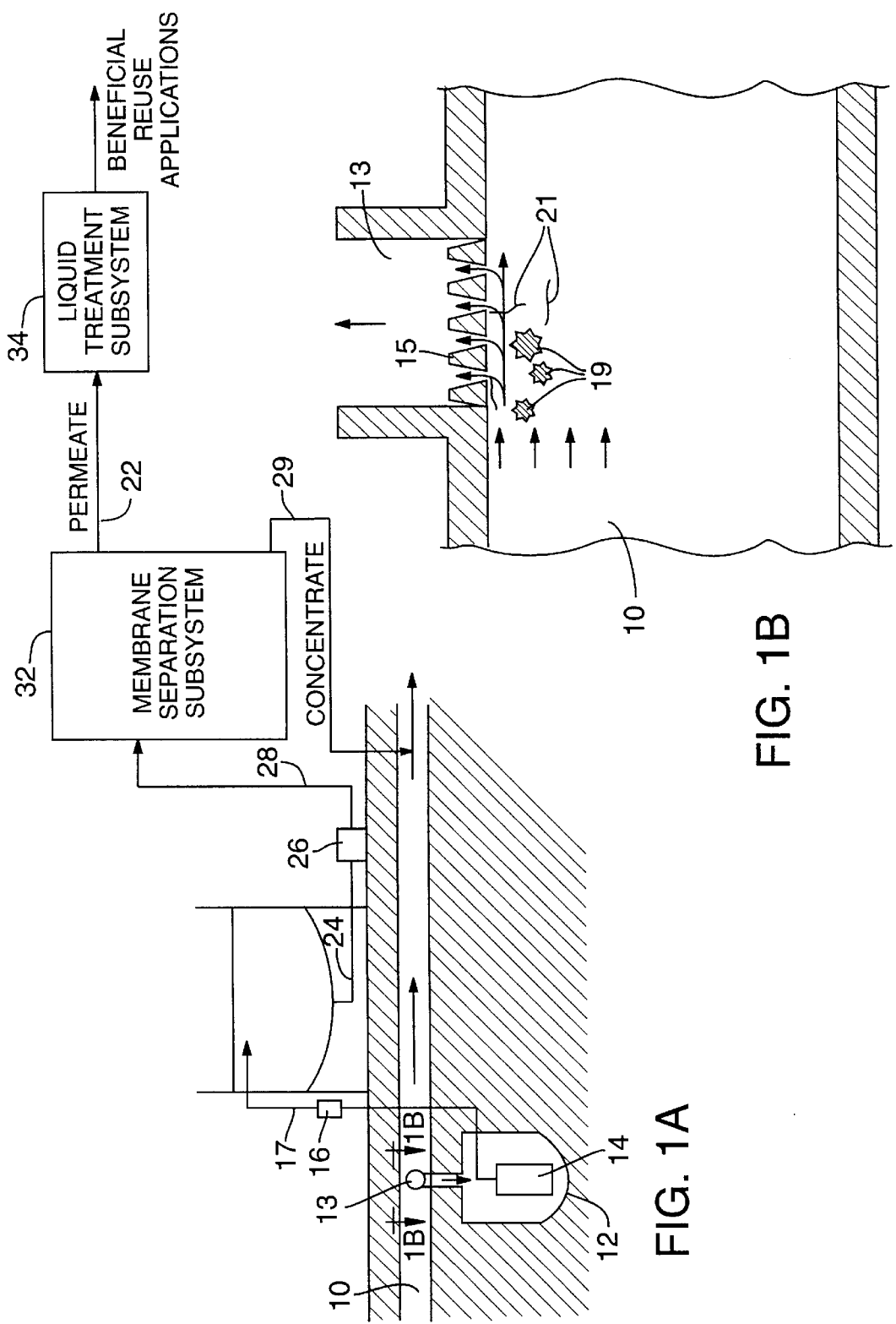

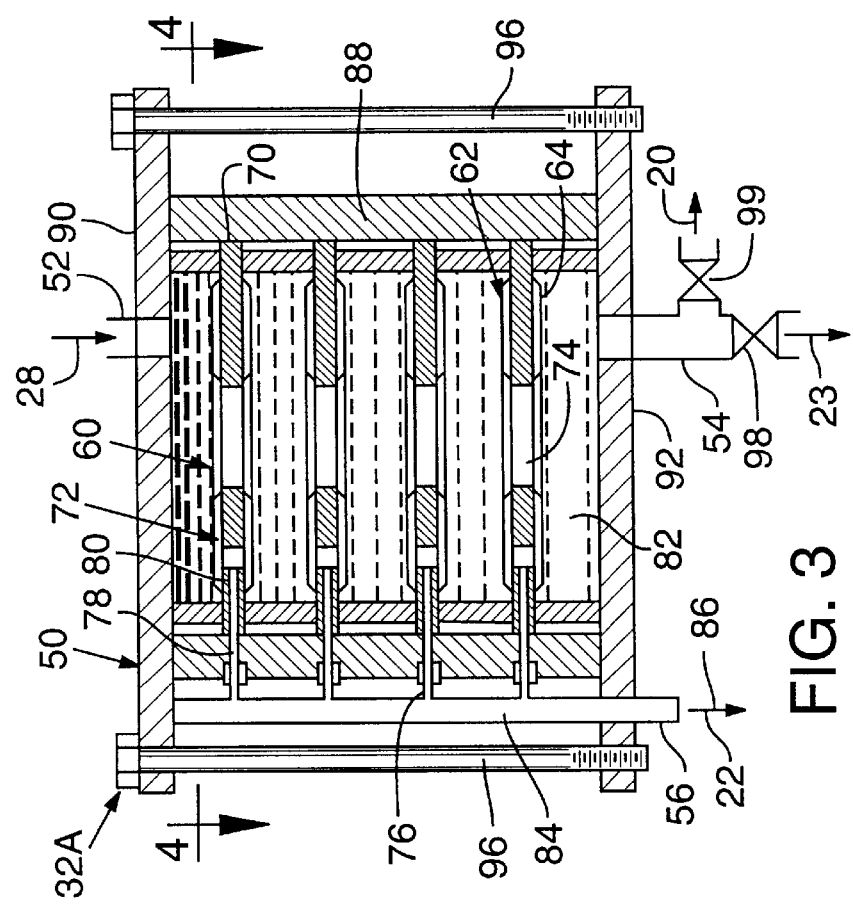
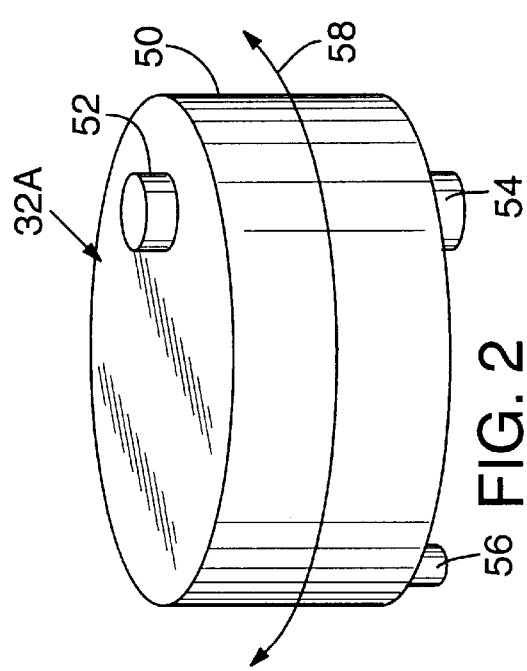
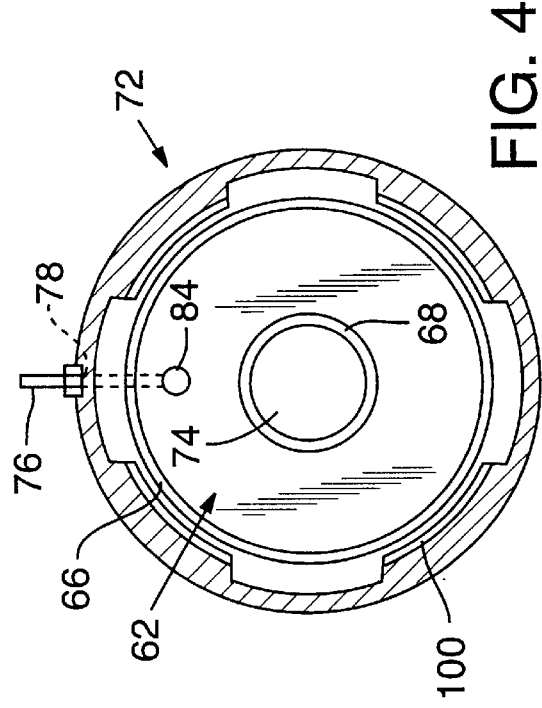

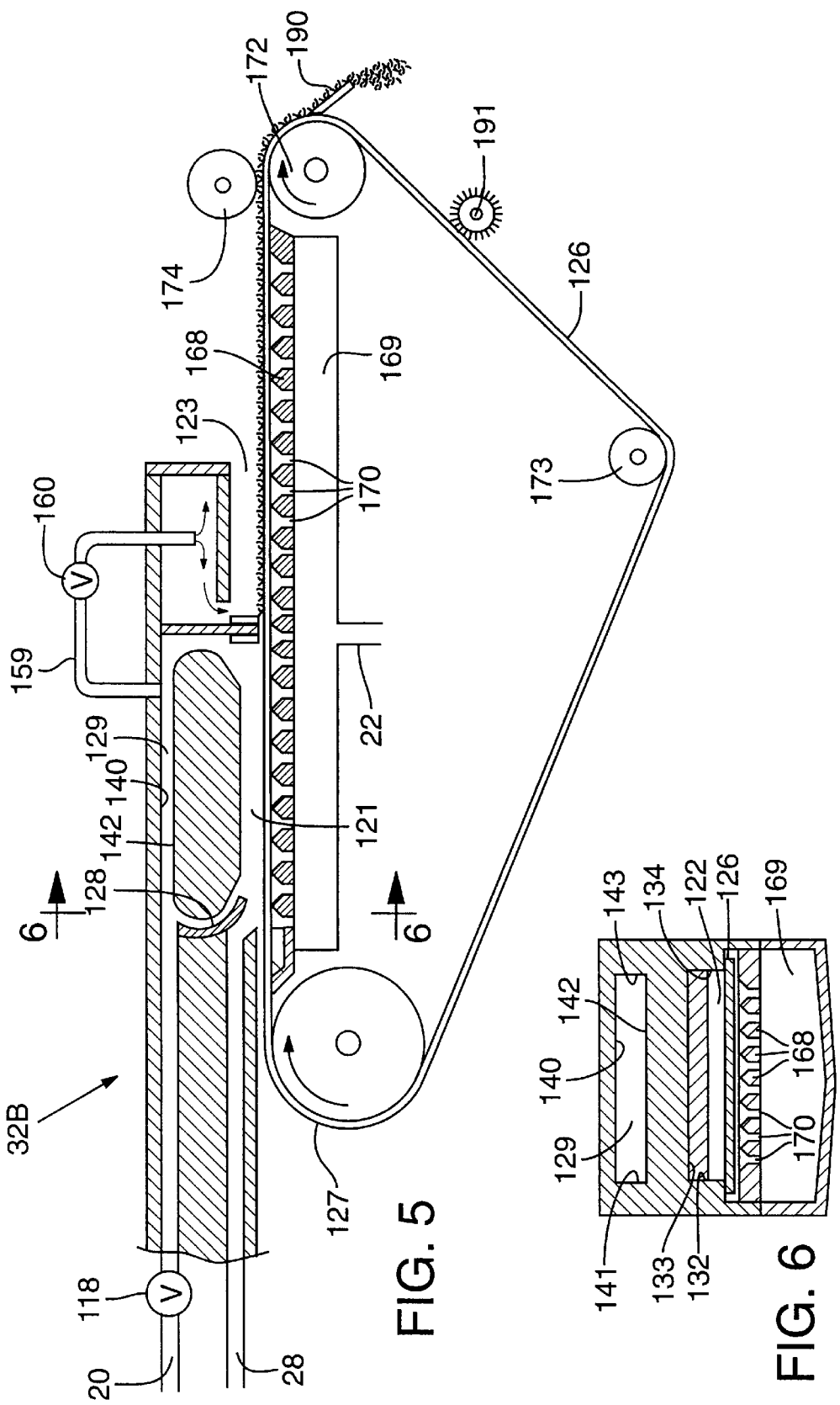

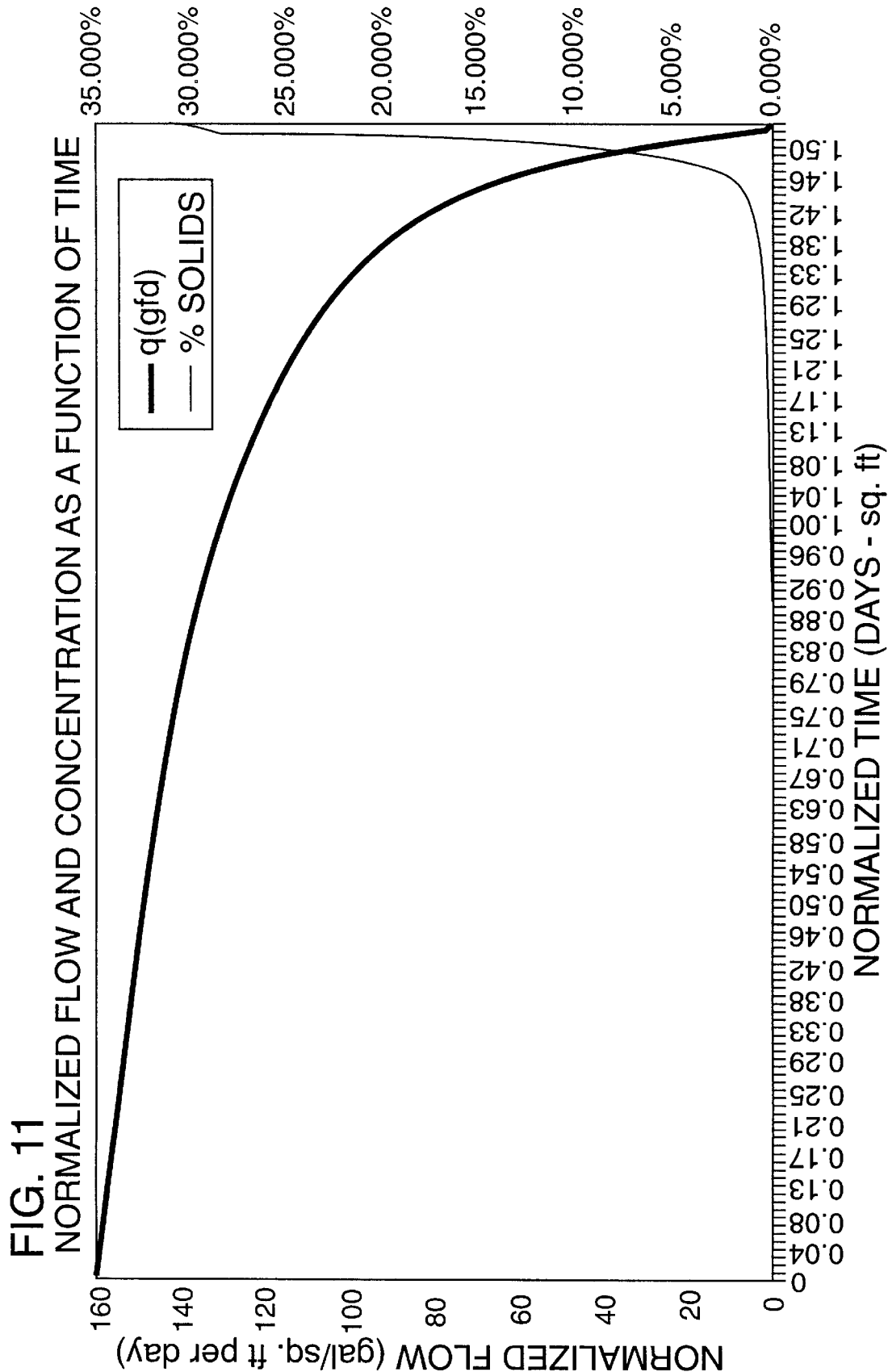
FIG. 11 NORMALIZED FLOW AND CONCENTRATION AS A FUNCTION OF TIME

MEMBRANE PROCESS FOR TREATING SANITARY WASTEWATER

SPECIFICATION

This is a continuation-in-part of application Ser. No. 718,762, filed Sep. 23, 1996, now abandoned.

BACKGROUND OF THE INVENTION

The invention relates to wastewater treatment, and, more particularly, to an efficient wastewater treatment, disposal and/or reuse method and apparatus utilizing membrane filtration.

Various systems have been used for treatment of residential and other wastewater. Those in common use involve, in at least one stage of their operation, biological digestion of wastewater in the liquid phase. The digestion process is susceptible to disturbances of flow, nutrient loadings, temperature, chemical content, accumulated sludge levels and other influences. Digestion requires long retention times in large tanks. Close supervision of the process by skilled operators is often required for acceptable performance, although such supervision is no guarantee of a good outcome. In so-called secondary treatment, the prevailing form of biological treatment, organic nitrogenous wastes are not entirely removed by the processes, but rather, are converted into soluble nitrate compounds that could potentially pollute surface and ground waters. The sludge produced by biological digestion is voluminous, very high in water content, and difficult to dewater and dispose.

Proper management of biological digestion processes by skilled personnel is practical for large municipal plants, but becomes economically infeasible for smaller on-site systems. The complexity and lag times of the biological processes make it impractical to regulate these process with automated control. Periodic failures of the biological processes result in the output of potentially infectious, highly polluted and malodorous effluents, for which there is little protection. Because of their susceptibility to upset and their requirement for maintenance by skilled operators, small-scale biological treatment plants, commonly referred to as "package plants", are banned in many jurisdictions.

Applications for which biological plants are clearly unsatisfactory include such deployments as: (1) resorts and entertainment stadiums with large variations in flow, (2) hospitals, where chemicals and/or drugs can upset biological processes; and (3) remote areas where on-site trained operators are unavailable.

An approach to wastewater treatment that treats the liquid portion of the wastewater by physical means offers the possibility of overcoming the limitations of biological treatment. Potential benefits are: consistent performance, automated electronic control, reduced size, usable liquid and solids byproducts, and relatively low cost. Yet the number of products and processes that have been developed for treating wastewater by non-biological means is very small, and none have found widespread use. Such approaches have involved the use of incineration; chemical treatment with coagulants, flocculants, adsorbants, filter aids and oxidants; electrolysis; radiation from nuclear sources; and physical treatments such as air flotation, filtration and centrifuging. Chemical and incineration approaches have been very expensive and energy intensive, often producing chemical laden sludges and air contaminants, which in themselves present a pollution problem. Filtration has been relatively unsuccessful because of the inability to achieve high rates of solids removal without fouling of the filters and the frequent need for backwashes which in themselves create a disposal burden.

One type of process and apparatus treating the liquid fraction of wastewater by physical means has been described in U.S. Pat. Nos. 4,137,062, 4,217,219 and 4,229,202. This system uses a process involving the following major steps: suction-aided paper filtration of fresh sewage, ultraviolet and ozone treatment of the filtrate, and composting of the used paper filter with accumulated screened solids. Testing of the prototype with actual sewage has shown that the process is capable of consistently yielding a liquid effluent that is thoroughly disinfected, and a solid byproduct that is low in volume and in odor.

But the process and apparatus of the aforementioned U.S. Pat. Nos. 4,137,062, 4,217,219 and 4,229,202 have several drawbacks that interfere with their practical application. The paper filter becomes quickly clogged, resulting in the consumption of large amounts of paper. Such paper is expensive, bulky, costly to ship and becoming increasingly scarce. Occasional flaws in or damage of the paper also can lead to inconsistent filtration and a polluted output. Replacing of rolls which supply the paper filter is difficult to automate such that continuity of operations is maintained. The composting of the solids is hard to regulate automatically, especially on a small scale, resulting in uncertainties about the degree of disinfection obtained and the possibility of pathogens still being present.

The disadvantages of paper filtration can potentially be overcome with membrane separation, for which higher removal of both solids and pathogen is obtainable. Membrane separation eliminates the need to consume and frequently replace the filtration medium and is not susceptible to flaws in the filtration medium. The challenges with membrane filtration are: (1) to maintain very high shear forces to achieve adequate flow rates; (2) to concentrate solids to a high level; and (3) to resist fouling of the membrane surface. A related design challenge is to clean membranes in place while minimally interfering with filtration efficiency.

U.S. Pat. No. 4,952,317 and 5,014,564 teach a system and apparatus for using vibration of membranes in linear, or orbital paths to effect high shear forces at the surfaces of the membrane, and thereby create high efficiency, foul-resistant separation of solids and liquids from a colloidal slurry. One embodiment of his system and apparatus has been reduced to practice by New Logic Inc. of Emeryville, Calif., which is presently marketing its Series I product line for industrial separation of industrial pollutants from waste streams by this means.

Alternatively, U.S. Pat. No. 5,259,952 describes a system using a continuous membrane belt filter with tangential application of feed under high pressure through a narrow channel to effect high shear forces, high flow rates, and fouling resistance. As of this writing, the system has been developed as a prototype by CERWAT Inc. of Knoxville, Tenn., but has not been commercially available.

The disadvantages of composting as a treatment of the screened solids can be overcome by treatment of the solids with quicklime or similar alkaline compound. This is an established technique for disinfecting, deodorizing and biologically stabilizing decaying organic matter by creating intense heat and a highly alkaline environment hostile to the survival of pathogenic organisms. Such treatment can be accomplished by the use of industrial wastes for which alkali solids are a component: this reduces the cost of the treatment, while improving the quality and stability of the soil byproducts so created.

U.S. Pat. No. 4,554,002 and 4,781,842 and 4,902,431 describe a process for disinfecting and stabilizing municipal wastewater sludges using particular admixtures of lime kiln dust, cement kiln dust and other industrial waste products that contain quicklime, claiming a low-cost, superior byproduct which has value as a soil amendment. Two processes described in these Patents have been approved by the U.S. Environmental Protection Agency under the classification "Process to Further Reduce Pathogens" (PFRP), which approval allows the byproducts to be reused for productive agricultural and landscaping use. These processes have been commercialized by N-VIRO corporation, which has used them successfully to treat sludges of municipal sewage treatment plants. The N-VIRO process has not, however, been incorporatied into small-scale wastewater treatment products. It has also been used with sludges that are primarily the products of biological digestion processes, both anaerobic and aerobic. These digested sludges are very watery and need to be dewatered by other means before they reach the level of solids concentration, at least 18%, for which the N-VIRO process is cost-effective.

A wastewater treatment system that avoids the use of biological treatment of the liquid fraction of wastewater, that overcomes the limitations of past physical/chemical systems, that produces reusable or readily disposed solid and liquid byproducts, and that is compact, economical, self-regulating, and reliable, would be a great advance in the art of wastewater treatment.

Objects and Advantages

Accordingly, it is an object of the present invention to provide a device and method that employs fouling resistant, high flux membrane means for separating selected solid and liquid components of wastewater containing sanitary wastes, with a variety of means for further treating the solid and liquid fractions into reusable byproducts.

It is a further object of the present invention to provide a device and method that employs fouling resistant, high flux membrane separation of liquid and solid components of wastewater containing sanitary wastes with means for disinfecting, deodorizing, drying and biologically stabilizing the solids fraction for productive reuses.

It is a further object of the present invention to provide a device and method that employs fouling resistant, high flux membrane separation of liquid and solid components of wastewater containing sanitary wastes with means for disinfecting and deodorizing the liquid fraction for productive reuses.

It is still a further object of the present invention to provide a device and method that employs fouling resistant, high flux membrane separation of liquid and solid components containing sanitary wastes with means for combining the solids fraction with other local solid waste products to obtain useful byproducts that are reusable or more readily disposed.

The invention possesses other objects and advantages especially as concerns particular characteristics and features thereof which will become apparent as the specification continues.

SUMMARY OF THE INVENTION

The invention described herein is a wastewater treatment and disposal system particularly well-suited for on-site or local applications in which productive reuse of solid and liquid byproducts is desirable. The basic principles of the invention are as follows:

Wastewater containing sanitary wastes is comminuted by a suitable device to form a relatively homogeneous slurry free of large particles. The slurry so created is applied to the exterior surface of a membrane or multiplicity of membranes in a closed channel in such a manner as to introduce a pressure differential across the membrane, and a high shear force tangential to the membrane surface. The pressure differential can be some combination of a positive pressure on the exterior membrane surface and a negative pressure on the interior membrane surface. Positive pressure can come from the comminuting device by itself, or in combination with a pressure boosting device. High shear can be induced either by vibrating the membrane along an axis tangential to the membrane surface, or alternatively, by applying the slurry tangential to the membrane within a pressurized channel.

The membrane chemical composition and structure are chosen to yield a desired removal of selected components from the slurry and to produce a permeate of purity suitable for a particular reuse application. The permeate is then extracted from the interior surface of the membrane either by gravity or by a negative pressure, for direct reuse/discharge or for conveyance to a subsequent treatment stage before being discharged or reused. The sludge accumulating on the outer membrane surface is allowed to concentrate in the closed channel until it reaches a desired level of solids content, whereafter it is returned to the input of the membrane separation system or removed for treatment by a variety of means for reuse or disposal.

The liquid permeate may be further treated by a variety of means depending on application. These means include: direct reuse; disinfection through the use of ultraviolet radiation, oxidation by ozone or chlorine; ion exchange; and activated carbon adsorption. Corresponding reuse applications include: irrigation of pasture land, landscaping or food crops; boiler feed; cooling towers; direct discharge into waterways, ponds and lakes; fountains; process water and drinking water.

The solids concentrate may be further treated by a variety of means depending on application. These means include: stabilizaltion/disinfection with admixtures containing quicklime or other suitable alkaline compound; composting with cellulose-based wastes; anaerobic digestion; aerobic digestion; heat pasteurization; and incineration. Corresponding reuse applications include soil enrichment, methane generation; energy generation; and livestock feed.

The system may also be employed as a means for retrofitting existing municipal sewer systems to extract, purify and either dispose or productively reuse the liquid fraction of the sewage to nearby disposal/reuse sites. In these applications the concentrate may be disposed back to the sewer without further treatment. Advantages of such an arrangement include the ability to reduce the hydraulic and to a lesser extent the biologic loads of overloaded central treatment plants, and/or to recycle purified water for nearby consumptive uses.

The degree of separation desired for the components of the wastewater will govern the choice of membrane chemical composition and pore size. For applications in which irrigation reuse is intended, nutrients contained in the wastewater are potentially valuable and need not be removed; rather the effluent needs only to be clear enough for subsequent disinfection methods such as ultraviolet radiation or ozonation to be cost-effective. This would suggest that pore sizes in the range of 0.5 to 1.0 micron would be suitable. For other more critical reuse applications such as for supply of recreational ponds and lakes, in which clarity and lack of nutrients is desirable, a finer pore structure in the nanometer range is appropriate. In all of these applications and pore sizes, a substantial degree of disinfection is achieved merely through the physical process of separation, since most pathogens and organisms of concern are relatively large compared with that of the pores. Pressures required to obtain a given flow rate vary inversely with the pore diameter for a given ratio of pore area to total membrane area; consequently, there is an energy cost when higher purities are desired.

Means are provided in the present invention for utilizing the membrane so as to effect high rates of flow, and to resist fouling of the membrane surface, both objectives being necessary for favorable economics of the process. Means are also included for concentrating and extracting the solids as needed to effect economical treatment for reuse or disposal.

One such means for obtaining high shear forces at the membrane surface, concentrating and extracting solids, and resisting fouling utilizes a pressure vessel of cylindrical or spherical construction in which one or more membranes having interior and exterior surfaces are sealed around a support to form one or more leaf elements. The interior surface of the membrane leafs are connected to the support of the leaf elements for movement therewith. The leaf elements also include an outlet for conduction of the liquid permeating the membrane (permeates). Such outlets may be formed as part of the support member. A slurry is admitted under pressure to the vessel through an inlet in communications with space around the exterior surfaces of the leaf elements. At the bottom of the vessel, also in communications with space surrounding the leaf elements is a concentrate outlet, which is connected to one or more bleed valves. The vessel and attached membrane leafs are vibrated in an orbital or torsional motion, while the bulk of the liquid remains relatively stationary, thereby creating high shear tangential to the membrane surface and, correspondingly, high flow rates through the membranes. With the bleed valves closed, solids within the vessel in the space surrounding the leaf elements build up in concentration and settle to the bottom of the vessel as permeate drains through the permeate outlet. Periodically, one of the concentrate bleed valves is opened to allow the accumulated concentrate to be pressed out of the vessel under the pressure of the input slurry.

Another means for obtaining high shear forces at the membrane surface, concentrating and extracting solids, and resisting fouling uses a membrane and support formed as a continuous foraminous belt mounted over two or more pulleys in a conventional conveyor belt arrangement. A slurry is applied to the membrane under pressure in a narrow closed separation channel over the width of the belt consisting of two sections that are disposed in tandem, one wall of which is the forward moving belt. The belt is slowly moved forward, and the slurry is applied at a high enough velocity greater than that of the moving belt to maintain the particles in suspension. Under the belt are one or more sealed chambers under suction to extract the permeate from the foraminous belt. The slurry as it progresses forward increases in concentration as liquid permeates the membrane at the bottom of the separation chamber. At the downstream end of the first section is a dam bearing against the belt which prevents the escape of the concentrated slurry; instead the solids concentrate is either returned to the input of the process through a return conduit on the upper wall of the first section of the separation channel or is collected by a tap in the conduit through a valve to the second section of the channel immediately forward in the direction of belt movement. In the second section, the concentrated solids are applied to the belt essentially at atmospheric pressure, and allowed to concentrate further as suction applied to the underside of the belt removes moisture accumulated in the pores. Solids are scraped off of the belt by a doctor blade or other means at the end of the forward section of the belt as it progresses over the drive pulley. Once the belt is on its return path, it is brushed by a rotating bristle brush which removes any remaining solids on the belt, thereby maintaining a clean surface for the next rotation of the belt.

Still further means are provided for disinfecting and deodorizing the liquid permeate to various degrees of purity, suitable for specific reuse applications. One such means is the radiation of the permeate by ultraviolet light from a mercury vapor lamp, with the flow of the permeate through clear plastic tubes which are transparent to ultraviolet sterilizing wavelengths, and are positioned adjacent to the lamps. One or more tubes may be used to handle different circuits of the permeate; for example, one circuit might be out of the permeate outlet of the membrane separation system feeding a storage tank in which the treated permeate is stored, while another might be in a circulatory circuit comprised of the storage tank, a pump and the plastic tube. Use of Teflon material for the clear plastic tube substantially reduces the likelihood for fouling of the tube surface, a problem which has plagued more traditional systems employing quartz sleeves to separate the liquid from the lamps.

Deodorization and disinfection may be additionally provided by using ultraviolet lamps which produce the 1849 Å ozone-producing wavelength in addition to the 2537 Å disinfection wavelength, and by injecting ozone generated in the air space surrounding the lamps into the flow streams. The relatively small amount of ozone produced by this means aids in disinfection, but is principally useful in eliminating residual odors in the permeate. Alternatively, larger amounts of ozone produced by a separate ozone generator can be diffused into the permeate. The addition of larger amounts of ozone will be advantageous in reducing any residual Chemical Oxygen Demand and Biochemical Oxygen Demand in the permeate, thereby rendering the permeate suitable for more critical reuse and discharge applications.

Means are also included for further treating the concentrated solids to yield byproducts which are disinfected and low in odor, suitable for reuse. One such means is the mixing of the solids concentrate with a suitable concentration of alkaline admixtures containing quicklime and buffering ingredients to bring the pH of the resultant mixture to a level exceeding 12, and allowing the mixture to cure for a suitable period at a pasteurizing temperature until all pathogens are killed and the mixture has further dried. Admixtures marketed by N-VIRO Co. for stabilization of municipal sewage sludge are well suited for this purpose, yielding a friable soil amendment with useful nutrient value that is biologically stable when wet or dry. Good results are obtained when using a solids concentration of 20% wastewater solids, and a ratio of 36% admixture weight to sludge wet weight. This creates a mixture that is approximately 40% solids by weight, that is intensely alkaline, that reaches pasteurizing temperatures of 52°–62° C., that dries quickly, and that when allowed to cure and aerate for 30 days is low in odor, free of pathogens and biologically stable, suitable for use directly as a soil amendment.

Means are further provided to combine the solids concentrate byproduct with other solid waste materials at or near the treatment site to obtain synergistic joint treatments. The mixture of alkaline admixture and concentrated wastewater solids, when added in suitable proportions to cellulose wastes such as wood chips, bark, straw, leaves and paper creates an environment highly favorable to thermophilic composting. This synergy comes from: (1) the provision of nitrogen by the wastewater solids; (2) the addition of lime from the admixture, which balances out organic acids generated by the decomposing cellulose wastes; (3) the reduction of moisture in the wastewater solids mix by the cellulose wastes; and (4) the thermal insulation provided by the cellulose wastes, which allow the heat of rehydration to reach is and maintain pasteurizing temperatures. The composting so obtained reduces the bulk of all the wastes, and creates a valuable soil amendment byproduct.

The devices and processes to provide the aforementioned treatments can be made to provide unprecedented reliability by virtue of using simple physical means for treating the liquid fraction of the wastewater rather than biological processes. The qualities of the solid and liquid byproducts can be made to consistently meet stringent prevailing legal and regulatory standards for reuse application. The machinery can be easily designed to be fail-safe, i.e. to stop the throughput of untreated waste under conditions of equipment failure. The machinery can readily be automated with self-diagnostic capability, eliminating the need for supervision by costly skilled personnel. The equipment can also be made compact, occupying less than 50% of the space and volume required of conventional biological plants that seek to attain a comparable level of treatment. Finally, the treatments consume little energy for the degree of purification they provide, less than 50% of that provided by tertiary treatment systems offering comparable levels of treatment.

It may be apparent that a novel and useful method of treating and reusing the solid and liquid components of domestic wastewater has been described, offering a number of unique and highly beneficial advantages.

DESCRIPTION OF THE DRAWINGS

FIG. 1A is a schematic view similar to FIG. 1, but showing a variation.

FIG. 1B is a cross-sectional view showing the detail regarding withdrawal of liquids from a sewage flow, as seen generally along the line 1B—1B of FIG. 1A.

FIG. 2 is a top perspective view of one embodiment of the membrane separation subsystem using torsional vibration.

FIG. 3 is an axial sectional view of the membrane separation subsystem of FIG. 2.

FIG. 4 is a section taken along line 4—4.

FIG. 5 is a sectional view of a second embodiment of the membrane subsystem using a membrane belt filter construction.

FIG. 6 is a cross-sectional view of the separation taken generally along the line 6—6 of FIG. 5.

FIG. 11 is a graph of normalized flow and concentration as a function of time.

DESCRIPTION OF PREFERRED EMBODIMENTS

Figure 1:
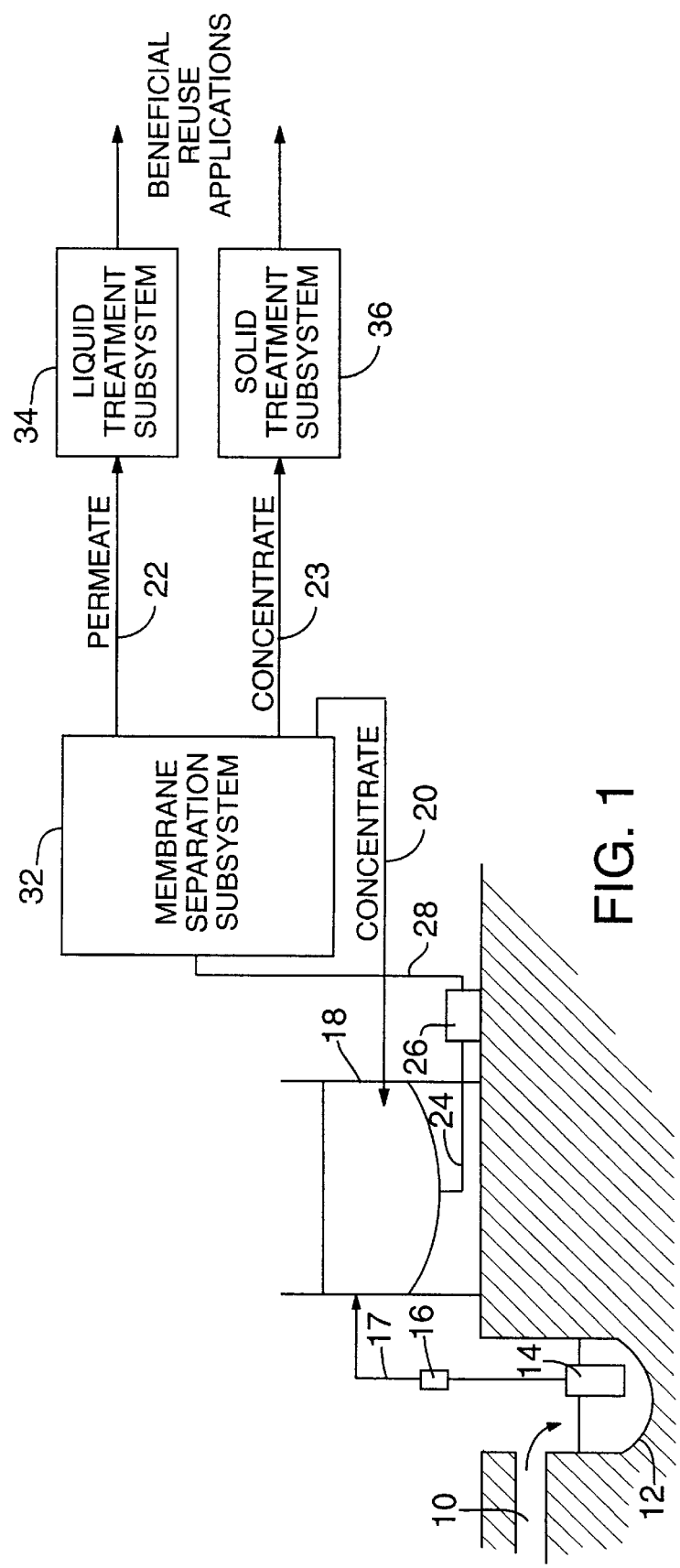
FIG. 1 is a schematic elevational view indicating the major components of the apparatus of the invention.

FIG. 1 is a schematic elevational view indicating the major components of the apparatus of the invention. Wastewater consisting of sanitary and other wastes empties from an underground sewer pipe 10 into an underground sump 12. In the sump preferably is a submersible grinder pump 14, for example an Aurora/Hydromatic AHG series, which simultaneously grinds the sewage solids into a slurry and pumps the slurry through check valve 16 into above ground tank 18 through conduit 17. Tank 18 drains through line 24 into pressure pump 26, for example a Moyno progressive cavity pump model B4D, which feeds membrane separation subsystem 32 through conduit 28. Membrane separation subsystem 32 outputs liquid permeate through conduit 22 and solids concentrate through conduit 23. Liquid and solids byproducts are subjected to further treatment by the liquid treatment subsystem 34 and solids treatment subsystem 36, respectively. Solids concentrate can also be returned to tank 18 through conduit 20. The processes and apparatus of subsystems 32, 34 and 36 shown schematically in FIG. 1 are detailed in subsequent illustrations which show several embodiments, each with upper case letters appended to the numbers 32, 34 and 36, respectively.

FIG. 1A shows a variation of the system shown in FIG. 1. Most of the components are the same; in this variation, the solids concentrate, or a portion of the solids concentrate, is not delivered to the solids treatment subsystem 36 of FIG. 1 but instead is delivered back to the sewer pipe 10, via a delivery conduit 29. The system of the invention, utilizing the membrane separation subsystem 32 as described below, reduces the volume of sewage drawn from the sewer pipe 10 to a very small solids concentrate fraction, with the liquid permeate delivered for other uses. By separating the liquid in the membrane separation subsystem 32, leaving a solids concentrate, the volume of the raw sewage can be reduced by more than 99 percent. In a number of situations this reduction of volume, with beneficial use of the separated liquid, can solve several problems even though the system does not include solids treatment. For example, if a sewage treatment plant is receiving sewage beyond capacity, or beyond capacity only at peak flow times, the reduction of volume entering the sewage treatment plant can avoid the need to build bigger facilities. At the same time, the liquid extracted from the sewage is available for beneficial use, such as irrigation.

In FIG. 1B the sewer pipe 10 is shown with a screening arrangement consisting of a tangential screen 15 along the side wall of the pipe, screened wastewater exiting the pipe 10 through the port 13, particles 19 and fiber and hairs 21 flowing in the wastewater stream of the pipe 10. Particles 19 and fibers and hairs 21 tend to stay in the sewer pipe 10, continuing forward by the inertia of their forward movement, while the cross flow conditions clean the screen of any particles that tend to adhere to the screen walls or to become trapped in the pores.

FIG. 2 is a top perspective view of a portion of the preferred embodiment of the membrane separation subsystem 32A which uses torsional vibration, such as the Model I series product made by New Logic. Subsystem 32A comprises a cylindrical pressure vessel 50, an inlet port 52 for pressurized slurry, an outlet 54 for solids concentrate and an outlet 56 for liquid permeate. The vessel is oscillated along a tangential path 58 by external means not shown. FIG. 3 shows an axial sectional view of the vibrating pressurized vessel 50 in which is depicted a plurality of disk-shaped leaf elements 60, shown also in the sectional view of FIG. 4 taken along line 4—4. The leaf elements each consist of a pair of membranes, such as 62 and 64, heat sealed to an outside rim 66 and inside rim 68. Leaf elements are separated by cylindrical support member 70 which permits the pre-stacking of a plurality of the leaf elements to assure accurate fitting of the same within the pressure vessel. In FIG. 4, it may be seen that leaf element 72 is shaped as an annulus with a pair of membranes 62 and 64 heat sealed to outside rim 66 and inside rim 68 surrounding opening 74.

Returning to FIG. 3, it may be observed that permeate removal tube 76 is inserted within leaf element 60 via opening 78 through pressure vessel 50 and passage 80 through support member 82. Permeate from the slurry 82 exits through tube 78 and passes to manifold 84 according to directional arrow 86. Pressure vessel 50 is formed of a cylindrical body 88 and a pair of plates 90 and 92. A multiplicity of long bolts 96 extend from top plate 90 to bottom plate 92. Slurry enters under pressure at input port 52 from conduit 28 and surrounds plurality of leaf elements 60 under pressure. Bleed valves 98 and 99, permit the removal of concentrated material from pressure vessel 50 through output conduits 23 and 20 respectively. With reference to FIG. 4, it should be noted that each of the plurality of leaf elements 60 includes a gap 100 which permits circulation of slurry 82 within plurality of leaf elements 60.

FIG. 5 is a sectional view of a second embodiment of the membrane subsystem 32B using a membrane belt filter construction. FIG. 6 is a cross-sectional view of the separation taken generally along the line 6—6 of FIG. 5. Slurry enters under pressure through conduit 28 into a separation channel 122 comprising first and second sections 121 and 123 respectively, having a bottom wall consisting of a foraminous medium formed into a continuous belt 126. Separation channel 122 is of rectangular cross-section defined by interior walls 132, 133 and 134 and the upper surface of foraminous belt 126. Belt 126 is positioned underneath the separation channel for travel in the direction of the arrows, is trained about a drive roll 127, an idler roll 172 and tensioning roll 173, and is supported by plate 168 with perforations 170. On the underside of plate 168 is a vacuum box 169, which applies suction from outlet 22 for that portion of the foraminous medium below sections 121 and 123 of the separation channel. Pressing on the belt is an optional pressure roller 174, and a rotating bristle brush 191. The slurry path is comprised of separation channel 122 in flow communication with upper return channel 129 and connecting channel 128. Bleed valves 118 and 160 allow the concentrated solids within upper return channel 129 to be sent back, respectively, to either input tank 18, shown in FIG. 1, or the drying portion of the belt positioned over the second portion of the separation channel 123. Return channel 129 is of rectangular cross-sectional contained by inner walls 140, 141, 142 and 143. Conduit 159 connects return channel 129 with the upstream end of the second section 123 through valve 160, where it opens to essentially atmospheric pressure. Downstream on the belt are pressure roller 174, and doctor blade 190.

Figures 7, 8:
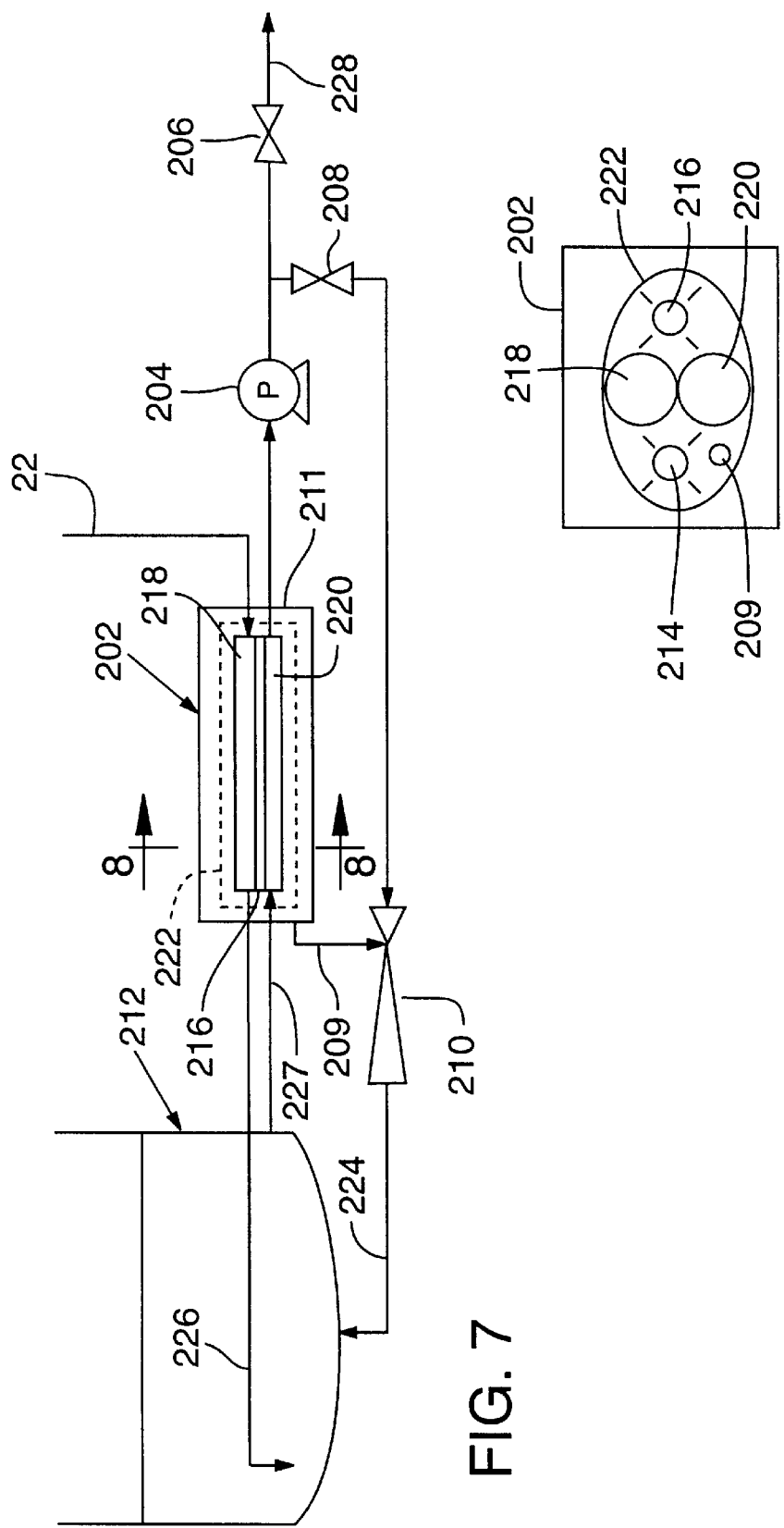
FIG. 7 is a schematic view of an embodiment of a permeate treatment subsystem.
FIG. 8 is a cross-sectional view of an ultraviolet disinfection unit.

FIG. 7 is a schematic view of a preferred embodiment for treating the permeate further to disinfect, deodorize, store and pump it. The subsystem comprises permeate input conduit 22, an ultraviolet disinfection unit 202, a pump 204, electrically actuated valves 206 and 208, a gas injector 210, and a storage/circulation tank 212. FIG. 7 is discussed in further detail below. The ultraviolet disinfection unit 202, shown in enlarged cross section FIG. 8, includes two ultraviolet lamps 214 and 216, two tubes 218 and 220 of clear fouling-resistant plastic that highly transmits the 2537 Å germicidal wavelength, such as fluorinated ethylene propylene (Teflon FEP), a metal reflector 222 of material such as anodized aluminum, which is an efficient reflector of ultraviolet light.

The construction of the ultraviolet disinfection system can be more readily understood from FIG. 8, in which a cross section is shown along the line 8—8. Here it can be seen that the two transparent flow tubes 218 and 220 are vertically arranged, with cylindrical ultraviolet lamps 214 and 216 horizontally positioned in the middle and on either side of the grouping of tubes 218 and 220. The assembly is enclosed by an elliptical aluminum reflector 222, which is so shaped as to efficiently reflect the radiation on the outer sides of the lamps towards the flow tubes. The tubes, lamps and reflector all extend for most of the length of disinfection unit 202, as shown in the side view of FIG. 7. Ozone generated by the 1849 Å wavelength of the lamps is exhausted through a port on the end of unit 202, which is connected to conduit 209. A corresponding port, 211 on the right end of unit 202, not shown in FIG. 8, allows outside air to enter unit 202 to replace that exhausted by conduit 209.

Figure 9:
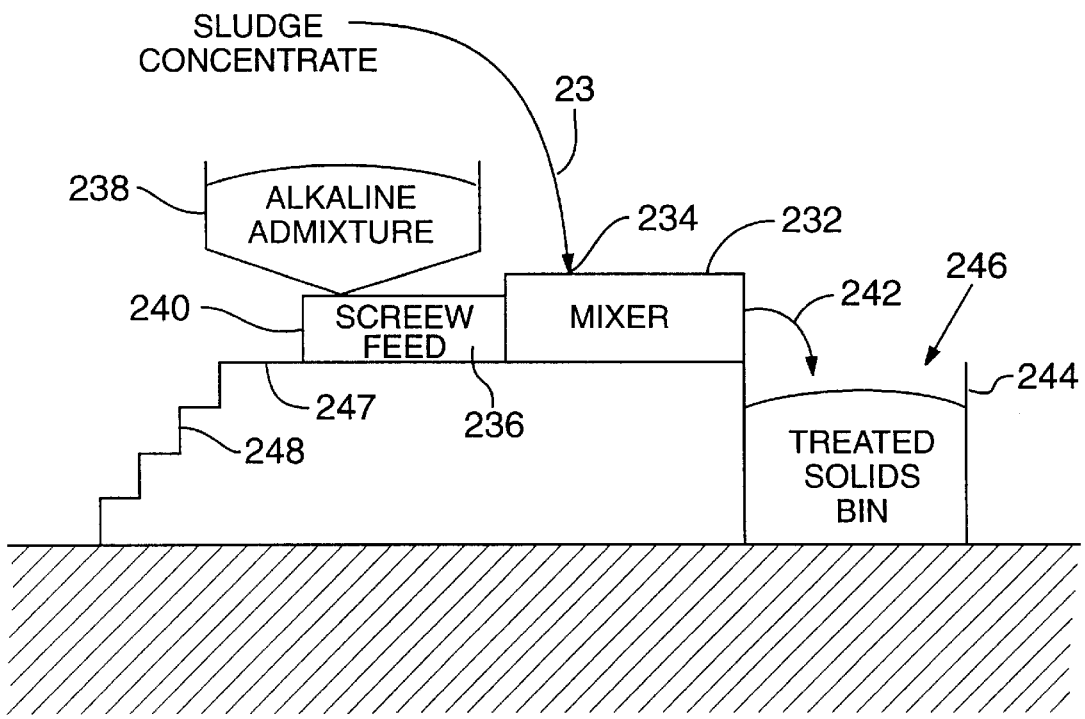
FIG. 9 is a schematic view of an embodiment of a solids treatment subsystem.

FIG. 9 is a schematic view of a preferred embodiment for treating the solids concentrate further to disinfect, deodorize, store it, and as an option, to incorporate other solid wastes in a synergistic combination. Shown is a source of solids concentrate 230, a mixer 232 with wastewater solids input 234 and alkaline admixture input 236, admixture hopper 238, screw feeder 240, mixer output 242, treated solids bin. 244, and cellulose wastes input 246. Mixer 232, screw feeder 240 and admixture hopper 238 are mounted on an elevated platform 247 accessible by stairs 248.

Figure 10:
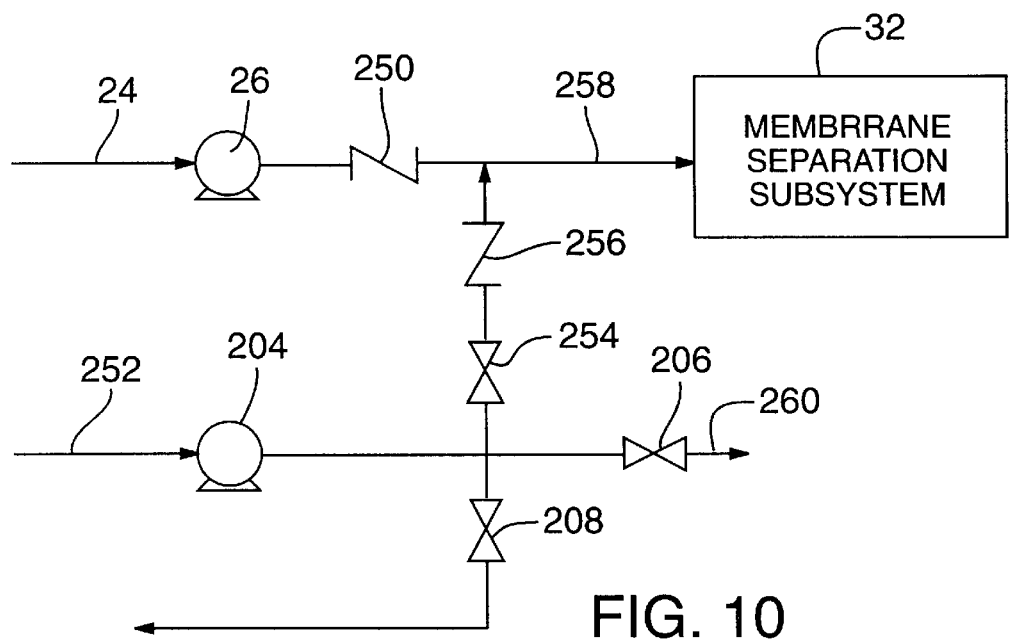
FIG. 10 is a schematic view of a flushing arrangement for the membrane separation subsystem.

FIG. 10 is a schematic of a flushing arrangement for the membrane separation subsystem derived from FIG. 1 comprising wastewater slurry conduit 24, pressure pump 26, disinfected permeate conduit 252, permeate pump 204, electrically-operated valves 206, 208 and 254, check valves 250 and 256, membrane separation subsystem feed conduit 258, and treated permeate output conduit 260.

Operation of the Basic System

Referring again to FIG. 1, wastewater consisting of sanitary and other wastes empties from an underground sewer pipe 10 into an underground sump 12. In the sump is a submersible grinder pump 14 which simultaneously grinds the sewage solids into a slurry and pumps the slurry through check valve 16 and pressurized conduit 17 into above ground tank 18. Grinder pump 14 may be at the same location as that of the other portions of the system or, alternatively, may be at the source of the wastewater, such as a residence, with pressurized conduit 17 transporting the slurry over long distances to a remote treatment station where the remainder of the system is situated. An example of the latter arrangement, which is readily accommodated by the current invention, is pressure sewer retrofits to septic systems.

Tank 18 drains into pressure pump 26, which feeds membrane separation subsystem 32 with pressures in the range of 100 to 400 pounds per square inch. Membrane separation subsystem 32 produces solids concentrate and liquid permeate byproducts which are subjected to further treatment by the solids treatment subsystem 36 and the liquid treatment subsystem 34, respectively. Under control of a valve within the membrane separation subsystem, a portion of the solids concentrate from the separation subsystem is returned to tank 18 for recycling and further solids concentration through membrane separation subsystem 32. Such recycling is desirable to reduce the gradient of solids concentrations within the membrane separation subsystem, which gradient lowers separation efficiency and limit the solids concentrations achievable.

Operation of a Preferred Embodiment of the Membrane Separation System

Returning to FIGS. 2, 3 and 4, a preferred embodiment is depicted of a membrane separation subsystem 32A which uses torsional vibration. Slurry enters input port 52 from conduit 28 and surrounds plurality of leaf elements 60 under pressure. Bleed valves 98 and 99 are initially closed, allowing a buildup of pressure in pressure vessel 50. The vessel is oscillated along a tangential path 58 by external means not shown. The combination of the high shear forces from the oscillations and the high internal pressures on the outer surfaces of the membrane leaf elements creates a high flow condition of permeate through the membranes, through permeate removal tubes 78 and manifold 84 to output port 56 and conduit 22. The high shear also has the effect of keeping particulate in suspension preventing it from precipitating on the membrane surface, and thereby causing fouling.

As permeate drains from outlet port 54, solids concentrations build within pressure vessel 50. Accumulating solids settle by gravity around the periphery of the leaf elements downward through gap 100 creating a gradient of solids within vessel 50, with maximum concentrations on the bottom. Periodically, valve 99 is opened for a short interval to release accumulated solids from vessel 50 for return to input tank 18, as depicted in FIG. 1. When solids reach the desired concentration, as can be determined, for example, by the reduction in flow rate of permeate from output 56, bleed valve 98 is opened allowing the solids to exit under pressure through conduit 23 for a period sufficient to allow the accumulated concentrate to be pushed out by the incoming feed.

Operation of the Preferred Embodiments of the Liquid Treatment Subsystem

With reference to FIG. 7, in which is depicted a preferred embodiment of the permeate treatment system, permeate exiting from the membrane separation system via outlet conduit 22 flows under pressure through clear plastic tube 218 of the ultraviolet disinfection unit 202 and into tank 212. Parameters of disinfection unit 202 in terms of radiation intensity, flow, turbulence, and tube diameter are chosen to ensure that under normal conditions, the passage of permeate initially through tube 218 will thoroughly disinfect the permeate. Disinfected permeate exits tube 218 through conduit 226 into permeate storage/circulation tank 212.

Independently, stored permeate in tank 212 is circulated through conduit 227, tube 220 of disinfection unit 202, pump 204, electrically actuated valve 208, gas injector 210 and conduit 224 back into tank 212. During this circulation mode, valve 208 is open and 206 is closed. While passing through this circuit, permeate already disinfected is further exposed to germicidal radiation via tube 220, and is disinfected and deodorized still further by the ozone/air mixture evacuated from ultraviolet disinfection unit 202 and introduced in the flowstream by injector 210. Circulation needs to occur frequently enough and long enough to ensure that stored permeate is kept fresh, deodorized and disinfected, but need not be continuous. Control of circulation is effected by turning on and off pump 204.

When stored permeate in tank 212 reaches a predetermined high level, the hydraulic circuit through pump 204 is changed by closing valve 208 and opening valve 206 to direct output to conduit 228. Output destinations will differ depending on application, and may include sprinkler irrigation, boiler feed, cooling towers, and discharge to surface water bodies. It can be seen that the characteristics of pump 204 are dictated mostly by the pressure and flow needs of the output application. For example, if output is to a sprinkler irrigation system, high pressures and flows will be required, while if discharge is to a waterway, pumping needs are minimal. With membrane pore sizes of 1.0 microns or less, the output liquid obtained at the output 228 will reliably meet disinfection requirements for irrigation of all crops according to the Title 22 code of the State of California, a strict standard that has become a defacto international standard for such uses. With pore sizes still finer, in the range of 1,000 MW to 8,000 MW, the water will be colorless, free of colloids, and suitable for low grade uses such as boiler feed, cooling towers, and discharge into lakes, streams and swimming areas.

Operation of the Preferred Embodiments of the Solids Treatment Subsystem

Operation of the preferred embodiment for solids treatment subsystem in FIG. 9 will now be discussed. Sludge concentrate of suitable concentration is output periodically under pressure through conduit 23 (shown in FIG. 1) into mixer 232. This discussion will assume that the source of the solids concentrate in conduit 23 is a membrane separation subsystem of the type illustrated in FIG. 2, 3 and 4 in which a vibrating pressure vessel is used. By way of example, a treatment unit with 300 sq. ft. of membrane area and a pressure vessel capacity of approximately 10 gallons, will have a treatment capacity of approximately 30,000 gallons per day, corresponding, for example, to the wastewater of approximately 100 households. With this configuration approximately 30 gallons of 20% solids concentration will be output three times per day in batches of approximately ten gallons each.

Mixer 232 also receives alkaline admixture from hopper 238, delivered by screw feed 240. The operation and flow of screw feed 240 and mixer 232 are coordinated with that of the opening of concentrate bleed valve 98 in FIG. 3 so as to blend the admixture and the solids concentrate in the desired proportions. Parameters of importance of the mixed output are the alkalinity and the moisture content; for thorough disinfection in accordance with the standards of the Environmental Protection Agency's approved Process to Further Reduce Pathogens, a pH in excess of 12 and a scolds concentration of at least 40% are required. Appropriate types of mixer include the in-line variety, in which the axis of mixer blade rotation is transverse to the material flow, or the mixer-conveyor type, in which the axis of mixer blade rotation is parallel to the direction of material movement. Motive force for pushing the mixture through the mixer can come from the pressure pump 26 feeding the membrane separation subsystem as shown in FIG. 1.

The admixture used can be either pure quicklime, some other suitable alkaline substance, or some mixture of alkaline material with buffering agents made from industrial wastes such as fly ash. Some of the alkaline substance may be supplied from industrial wastes such as cement kiln dust, lime kiln dust, or fly ash in which limestone has been added during incineration to assist in sulfur removal. The mixture of lime with other wastes is preferable to pure quicklime in that it has a more easily handled granular texture, absorbs moisture, reaches pasteurizing rather than sterilizing temperatures, and creates a byproduct which is more stable and soil-like in texture and ecology. In either case it is necessary that the treated solids achieve a pH in excess of 12. It is also desirable but not necessary to keep the heat of reaction in the range of 52°–62° C., which ensures total kill of all pathogens, yet maintains the survival of soil flora.

The admixture hopper 238 is positioned close to the floor of platform 247 to allow maintenance personnel to fill the hopper easily with minimal risk of injury. Admixture flows into screw feed 240 by gravity, making it convenient for the mixer fed by the screw feed to also be at platform 247 floor level; this, in turn, makes it convenient to place the solids bin 244 which receives the output of the mixer 242 at ground level. The relative positioning of the equipment allows for a simple and compact arrangement of standard off-the-shelf component parts, consuming minimum amounts of energy for operation.

Output 242 of the mixer discharges by gravity into the treated solids bin 244 with the same frequency and approximate duration as the opening of bleed valve 98 in FIG. 3. The treated solids accumulate in bin 244 until it is filled. The filled bin is then replaced with an empty bin. The filled bin, now isolated, is allowed to sit and "cure" for a period of time to allow drying, heating and disinfection to proceed. Thus, it is convenient to use a plurality of treated solids bins 244 at the treatment site in rotation, with one collecting treated solids, while one or more are curing. Use of wheeled bins makes it convenient to move the bins. The treated solids after curing will have a high fertility, and a soil-like consistency and odor, making them excellent for application as a soil amendment to nearby lawns, landscapes and gardens.

The period of curing needed before reuse of the treated Is solids as a soil amendment is allowed by the PFRP standard will vary. Governing factors are the ambient temperatures, the exothermic heating temperatures reached during curing, the rate at which drying takes place, and the final solids concentration. The desired solids concentration of the final product is a minimum of 50%.

As an option, cellulose wastes such as wood chips, straw, clippings, and even paper can be added to the bin to create compost, as shown by arrow 246 in FIG. 9. Addition of these wastes in alternate layers with treated wastewater solids 242, in such proportions as to yield a 30:1 ratio of carbon to nitrogen for the combination, results in the optimum conditions for thermophilic composting. The thermophilic reaction is further promoted by the exothermic heat of rehydration of the quicklime in the admixture, and by the high alkalinity, which offsets organic acids in the mixture that retard the composting process. The insulating effect of the cellulose wastes and their entrained air assure that the heat of rehydration will produce the high temperatures needed for rapid kill of any pathogens that might be present.

Operation of a Flushing Subsystem for the Membrane Separation Subsystem

The arrangement shown in FIG. 10 is a preferred embodiment of a system for flushing the membrane separation subsystem. Such flushing is desirable during dormant periods to purge the chambers and conduit on the feed side of the membrane separation subsystem of accumulated concentrate, and to replace it with clean ozonated permeate. The reason for doing this is to minimize the potential for fouling of the membrane surface by stagnant, concentrated, organically loaded wastewater. This is particularly a concern when the system is shut down and the high shear on the membrane surface is removed. Dissolved ozone and other oxidants in the permeate created by diffused ozone are a desirable added feature to kill any organisms that might remain even after the flushing, and also, to oxidize putrescible compounds.

The components of FIG. 10 include elements of both FIG. 1 and FIG. 7. From FIG. 1 is slurry feed conduit 24, pressure pump 26, and input conduit 28 to the membrane separation subsystem. From FIG. 7 is input conduit 22, pump 204, and electrically actuated valves 206 and 208. Added to FIG. 10 are new components consisting of electrically actuated valve 254 and check valves 250 and 256.

Under normal operation valve 254 is closed and valves 208 and 206 are alternately opened, as treated permeate is either circulated or output from the system. Also under normal operation, slurry is delivered under pressure by feed pump 26 through check valve 250 and conduit 258 to the membrane separation subsystem 32. When flushing is desired such as during dormant periods of operation, valves 206 and 208 are both closed, pump 26 is turned off, and valve 254 is opened. Also during this time, bleed valve 99 of the membrane separation subsystem (FIG. 3) is opened to allow accumulated concentrate in the vessel to return to input tank 18. The result is that disinfected and ozonated permeate is fed under pressure by pump 204 to the membrane separation subsystem, thereby replacing the accumulated concentrate.

Flushing should be repeated at regular intervals during extended dormant periods to ensure that the contents of the feed chambers, whether it be concentrated slurry or permeate from the last flushing cycle, not have opportunity to become stagnant.

Testing of Process Parameters

Testing to provide data on choices of membrane, associated flow rates and permeate quality were made using actual sewage from the Richmond Field Station test facility of the University of California, fed to a New Logic Series L laboratory membrane filtration unit. The sewage used at the test facility was drawn from a municipal sewer, comminuted and pumped through a grinder pump. The Series L laboratory unit employed uses the same Vibratory Shear-Enhanced Processing ("V-SEP") technology as is used in New Logic's industrial-size machines and as is protected by the aforementioned U.S. Pat. Nos. 4,952,317 and 5,014,564. The membranes chosen covered a large range of porosities ranging from 150–300 MW producing pure water suitable for critical reuse/discharge applications to 0.2 micron for irrigation types of uses.

The results are shown in Table 1. The following observations are made:

1. The suspended solids, nitrate and coliform measurements show negligible quantities in all permeate samples, suggesting that these aspects of water quality are very high. Low nitrate is a direct result of there being negligible quantities of nitrate in the sewage feed itself. Fresh sewage contains organic forms of nitrogen and some ammonia, but little nitrate, which is

TABLE 1

RESULTS OF PRELIMINARY TESTING

| Membrane | PREMEATE SAMPLES FOR SEWAGE FEED | | | |
|---|---|---|---|---|
| Model no. | DS-5 | K-200 | G-50 | AF-100 |
| Material | Thin film composite polyamide on a polysulfone backing | Teflon | Thin-film composite | Kynar |
| Pore size | 150–300 MW | 0.2 micron | 8,000 MW | 100,000 MW |
| Measured flow w/o concentration (gallons per sq. ft per day) | | | | |
| @ 200 psi | 77.9–84 | 114.3–131.2 | 97–160 | 110–164 |
| @ 300 psi | 111.3–114.5 | | | |
| @ 400 psi | 108.9–138.8 | | | |
| Laboratory analyses | | | | |
| Total suspended solids (mg/l) | N.D. | N.D. | N.D. | |
| BOD (mg/l) | 9 | 70 | 20 | |
| Total dissolved solids (mg/l) | 240 | 360 | 310 | |
| Total coliform | 4.6 | 4.6 | >8 | |
| Nitrate (mg/l) | N.D. | N.D. | N.D. | |
| Total organic carbon (mg/l) | 37 | 56 | 15 | |
| Kjeldahl nitrogen (mg/l) | 7.9 | 11 | 7.7 | |
| Total phosphorus (mg/l) | 0.13 | 1.2 | 0.71 | |
| Potassium (mg/l) | 1.1 | 3 | 2.9 | | primarily the product of biological digestion. Nitrate quantities, by contrast, are high in the effluent of so-called secondary treatment (biological digestion).

2. The very low coliform counts and immeasurable suspended solids suggest that a very high degree of pathogen removal will be obtainable by merely the physical membrane separation process, and also, that very little subsequent ultraviolet dosing will be required to thoroughly disinfect the permeate to meet standards for all uses.

3. Eiochemical Oxygen Demand (BOD) was reduced by varying degrees for the different membranes. For the tightest membrane, the DS-5, BOD was 9 mg/l, which will meet the most critical uses and discharge requirements. For the loosest membrane, the K-200, BOD was 70 mg/l which exceeds discharge requirements for most surface waters, but represents no problem for irrigation uses. In any case, BOD can be subsequently reduced by chemical oxidation of the permeate with ozone.

4. Total dissolved solids were reduced somewhat from the feed, but still were in the range of 240 to 360 mg/l for the sample of sewage used. The standard laboratory method for measuring dissolved solids involves the use of a 1.2 micron filter; therefore, dissolved solids reductions can be expected for membranes with a porosity finer than 1.2 microns (all of those used in these tests). Nitrate, a dissolved solid of particular concern, was absent. Ammonia, another dissolved solid of concern, although not measured, can be also expected to be present in small amounts since it is primarily a byproduct of chemical and biological digestive processes which are not employed for treating the liquid fraction.

5. Flow rates were quite high for most of the samples measured, although, as can be expected, the DS-5 tight membrane required approximately 50% more pressure (and correspondingly, higher electrical energy consumption) to reach flow rates comparable to that for the larger pore membranes.

6. The flow rate of all membranes had a tendency to drop somewhat over time. In all cases but the G-50 membrane, the flow rate could be restored almost fully by use of a special cleaning technique. This technique involves momentarily increasing the backpressure on the permeate side of the membrane by constricting the flow, thereby decreasing the differential pressure across the membrane to a low level while at the same time maintaining the vibrational shear.

These tests were made without concentrating the feed, so they only characterize the flow that can be expected with the initial concentration. Extrapolation of flow levels to other feed concentrations can be approximated conservatively by assuming a logarithmic relation between concentration and flow, with a flow that drops to zero for 30% concentration. This relationship is plotted in FIG. 11 in for the case in which the concentrate is fed back as feed to the membrane while the permeate is extracted. The initial flow parameter of 160 gallons/ft per day is approximately that measured for the AF-100 membrane, which has desirable flow characteristics.

Calculations for the curve of FIG. 11 representing the concentration of wastewater from 0.02% to 30% solids, yields an average flow value of 130 gallons/ft per day. Corresponding to this flow are total electrical power operating costs, as needed for both pressure feed and vibration of the membrane, of approximately $0.50 per 1000 gal, a very competitive power cost for a wastewater treatment process yielding the qualities of effluent shown.

We claim:

1. A process for treating fresh wastewater containing sanitary wastes from a fresh wastewater stream into reusable liquid and solid components, comprising:

withdrawing wastewater containing sanitary wastes from said wastewater stream, comminuting converting said wastewater containing sanitary wastes into a slurry;

applying said slurry to the exterior surface of a membrane having an exterior surface and an interior surface, said membrane being permeable to selected liquid components of the slurry;

applying a pressure to motivate permeation of said membrane by said selected liquid components of the slurry;

extracting the selected liquid components as a liquid permeate from the interior surface of said membrane and removing the liquid permeate from the membrane, for discharge or productive reuse;

concentrating solids from said slurry on the exterior surface of said membrane;

extracting the solids concentrate from the exterior surface of said membrane and removing the solids concentrate from the membrane; and said process including a step of treating the liquid permeate of said wastewater without any biological processes, thereby avoiding problems inherent with said biological processes.

2. The process of claim 1, wherein the step of treating the liquid permeate includes disinfecting the liquid permeate.

3. The process of claim 2, wherein the treating step includes deodorizing the permeate and chemically oxidizing putrescible compounds in the permeate to lower their biochemical oxygen demand.

4. The process of claim 2, wherein the step of treating the liquid permeate includes the exposure of said permeate to germicidal ultraviolet radiation.

5. The process of claim 2, wherein the step of treating the liquid permeate includes mixing at least one chemical oxidant into said permeate for the purposes of disinfecting and deodorizing the permeate and chemically oxidizing putrescible compounds in the permeate to lower their chemical oxygen demand.

6. The process of claim 5, in which said chemical oxidant comprises ozone gas.

7. The process of claim 1, including creating high shearing forces between said slurry and said exterior membrane surface, thereby to maximize rate of permeation of the membrane and minimize fouling of the membrane surface.

8. The process of claim 4, wherein the step of creating high shearing forces on the membrane surface comprises vibrating the membrane in a vessel containing said slurry.

9. The process of claim 1, wherein said membrane is formed into a foraminous continuous belt.

10. The process of claim 9, including creating high shearing forces between said slurry and said exterior membrane surface, to thereby maximize the flow rate and minimize fouling of the membrane surface, the step of creating high shearing forces comprising applying the slurry under pressure tangential to the exterior membrane surface of said belt through a narrow channel comprised of said belt, a stationary upper plate and two stationary side walls.

11. The process of claim 1, including treating the solids concentrate to stabilize and disinfect the solids concentrate.

12. The process of claim 11, wherein the step of treating the solids concentrate includes mixing the solids with an admixture containing quicklime or other highly caustic or alkaline substance to provide a combination of alkalinity, water removal, and exothermic temperatures as needed to stabilize and disinfect said wastewater solids concentrate.

13. The process of claim 11, wherein the step of treating the solids concentrate includes mixing the solids with wastes containing cellulose, thereby absorbing moisture, introducing air, and providing a supportive environment and food supply for competing organisms which digest pathogenic and odor producing organisms within said solids concentrate.

14. The process of claim 11, wherein the step of treating the solids concentrate includes mixing the solids with soil, thereby absorbing moisture, and introducing competing organisms which digest pathogenic and odor producing organisms within said solids concentrate.

15. The process of claim 1, further including returning the solids concentrate to the fresh wastewater stream, downstream in the wastewater stream from the withdrawing step, thereby greatly reducing overall downstream volume in said fresh wastewater stream by removal of the liquid fraction.

16. The process of claim 15, further including, in the withdrawing step, preliminarily screening fresh wastewater by withdrawing the wastewater containing sanitary wastes from the wastewater stream through a screen substantially tangential to the stream, thereby creating cross flow conditions which minimize suspended solids content of wastewater delivered to said permeable membrane and which inhibit clogging of the screen by suspended solid components of the stream.

* * * * *

UNITED STATES PATENT AND TRADEMARK OFFICE
CERTIFICATE OF CORRECTION

PATENT NO. : 5,837,142
DATED : November 17, 1998
INVENTOR(S) : Steven B. Mullerheim, et. al.

It is certified that error appears in the above-identified patent and that said Letters Patent is hereby corrected as shown below:

```
Column 7, line 9, delete "is".
Column 12, line 50, delete "scolds" and replace with --solids--.
Column 13, line 36, delete "Is".
Column 15, line 35, delete "Eiochemical" and replace with
--Biochemical--.
Column 16, line 54, delete "converting".
Column 17, line 29, delete "4" and replace with --7--.
```

Signed and Sealed this

Twenty-fourth Day of October, 2000

Q. TODD DICKINSON

*Attest:*

*Attesting Officer*         *Director of Patents and Trademarks*